United States Patent
Purser

[19]

[11] Patent Number: 5,945,152
[45] Date of Patent: Aug. 31, 1999

[54] METHOD OF PREPARING A FULLY-COOKED SEMI-MOIST SHELF STABLE MEAT PRODUCT

[76] Inventor: David E. Purser, 906 Riverstone Dr., San Antonio, Tex. 78258

[21] Appl. No.: 09/013,606

[22] Filed: Jan. 26, 1998

[51] Int. Cl.⁶ .................................. A23L 1/31; A23J 1/00
[52] U.S. Cl. ............................................ 426/646; 426/656
[58] Field of Search ................................. 426/324, 574, 426/519, 521, 524, 532, 641, 513, 523, 646, 656

[56] References Cited

U.S. PATENT DOCUMENTS

| | | |
|---|---|---|
| 3,745,021 | 7/1973 | Middlesworth et al. .................. 99/107 |
| 3,873,736 | 3/1975 | Palmer et al. ............................. 426/92 |
| 4,143,171 | 3/1979 | Buckley et al. ......................... 426/331 |
| 4,185,123 | 1/1980 | Wenger et al. .......................... 426/272 |
| 4,358,468 | 11/1982 | Dolan et al. ............................. 426/250 |
| 4,546,004 | 10/1985 | Rhee et al. ............................... 426/656 |
| 4,645,677 | 2/1987 | Lawhon et al. .......................... 426/431 |
| 5,296,253 | 3/1994 | Lusas et al. .............................. 426/629 |
| 5,300,312 | 4/1994 | Lusas et al. .............................. 426/634 |
| 5,382,444 | 1/1995 | Roehrig et al. .......................... 426/646 |
| 5,437,885 | 8/1995 | Lusas et al. .............................. 426/302 |

*Primary Examiner*—David Lacey
*Assistant Examiner*—Drew Becker
*Attorney, Agent, or Firm*—Jenkens & Gilchrist

[57] ABSTRACT

A method for producing a fully-cooked, semi-moist, shelf stable meat product by: mixing common ingredients that act as antimicrobials or bacteria growth suppressors with raw meat, choosing other ingredients to add to the mixture for controlling end-product water activity, cooking the resulting mixture at temperatures which produce pasteurization, and controlling end-product package atmosphere. The method of preparation comprises admixing meat (any species of suitable animal protein) with vegetable particulates, flours, isolates, concentrates, or other extendable protein sources. The resulting mid-process product is then mixed with water replacing compounds, or humectants, such as sugar, salt, flavors, colors, preservatives. The raw product mixture is then moved to a scraped-surface heat exchanger for pasteurization. The method is complete after cooling the product to ambient temperature and packaging under anaerobic vacuum using a moisture/microbe impermeable barrier.

20 Claims, 1 Drawing Sheet

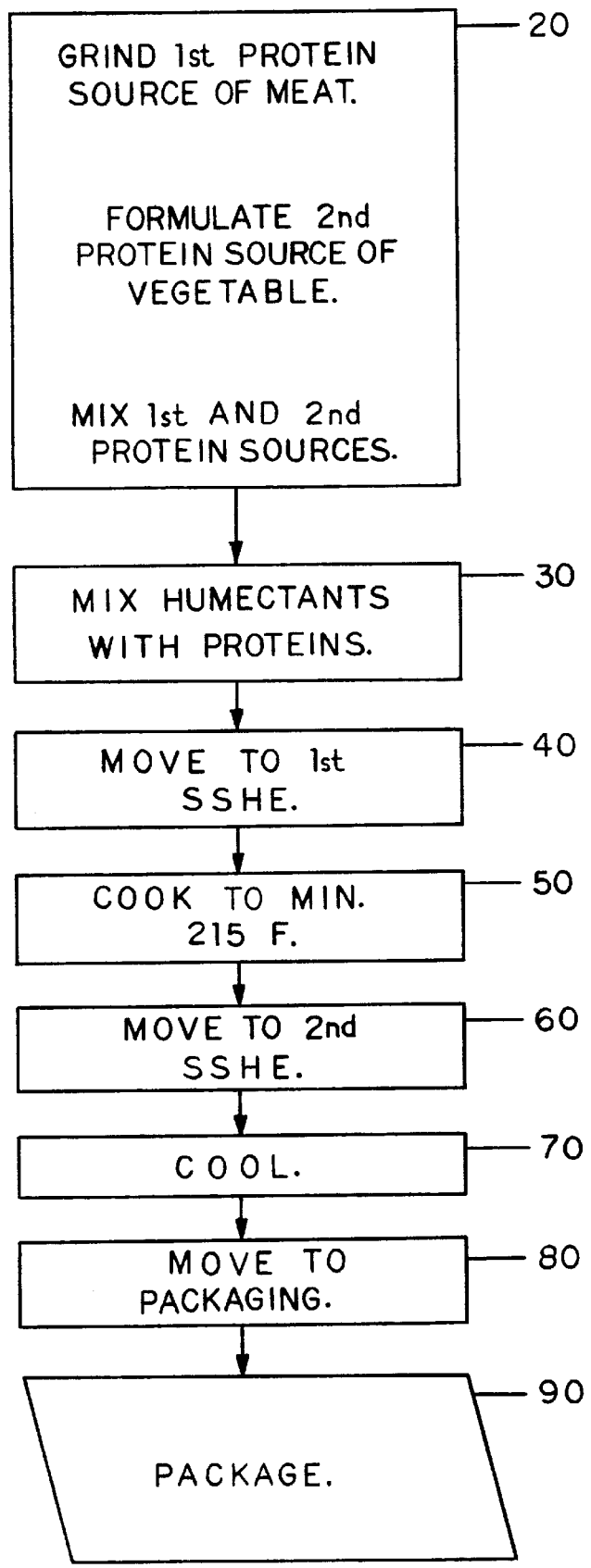

METHOD OF PREPARING A FULLY-COOKED SEMI-MOIST SHELF STABLE MEAT PRODUCT

BACKGROUND OF THE INVENTION

1. Field of the Invention

This invention relates to a method for processing meat protein and other ingredients to produce a fully-cooked, semi-moist, shelf stable meat product. More particularly, this invention relates to a method comprising a series of pasteurization and mixing steps whereby the resulting fully-cooked meat product, with a taste and texture similar to that of freshly-cooked meat, remains free from pathogen-causing levels of bacteria and can be stored for an extended period of time without refrigeration due to inherent anti-microbial properties.

2. Background of the Invention

Animal meat proteins are a source of quality nutrition in the human diet. Such proteins are desired for their balance of flavor, nutritional value, and serve as the single most complete source of essential amino acids. Meat and meat products have historically been a priority in the diets of most people, but have become increasingly cost prohibitive. As a result, filler ingredients have been added to enhance nutritional quality and lower production costs. Vegetable components can be added to neutralize cholesterol. Fat replacement ingredients, such as starches and flours, can be added to further enhance nutritional quality. Other ingredients can be added to enrich and flavor the resulting products for acceptance within a particular culture. The method and product described herein not only provides a source of protein enrichment having an extended shelf life without refrigeration, but also offers a nutritionally sound product which can be made at cost lower than that of conventional meat protein based products extended by fillers.

In order for meat products to be classified as shelf stable, they must have the ability to be stored for extended periods of time without refrigeration, and without compromising product quality and flavor due to either microbial deterioration, or oxidative reduction. Such meat products must pass government USDA and FDA requirements to obtain a "shelf stable" classification. The principal problem in manufacturing shelf stable meat products is the growth of microorganisms within the nutrient-rich environment of the meat itself. Muscle meats contain approximately 70% water that is available for microbial growth (i.e., unbonded "free" water). In addition, yeasts and molds can effectively exist at even lower water availabilities. To be considered safe for consumption, a practical fully-cooked, shelf stable meat product should be able to inhibit mold and yeast growth, reduce the growth rates of microorganisms already present, and inhibit the growth of new bacteria. Maintaining a favorable taste is also necessary.

The term "semi-moist" shelf stable meat refers to a meat product that is similar in mouth feel and texture to freshly cooked meat, and which exhibits properties that enable the product to resist significant levels of microbial growth when stored without refrigeration for an extended period of time. The product should be further capable of resisting microbial growth when exposed to microorganisms which were not originally present in the product after processing. Microbial proliferation within processed meats depends not only on the amount of moisture available for microorganism growth and nutritive support, but also on the pH of the product, oxygen availability, and proper initial cooking conditions, among other elements. Semi-moist shelf stable meat technology, when fully developed, can be expanded to include multi-component shelf stable products, including meats, beans, legumes, meat salad spreads, chile, burrito/pizza-type food combinations, high calorie protein bars/supplements and meat-flavored cooking ingredients.

Attempts at producing an improved shelf stable meat product include U.S. Pat. No. 3,745,021 issued to Van Middlesworth et. al., which describes a method of pet food manufacture using extrusion cooking of meat trimmings combined with 6–12% water and 3–25% of a mixture containing equal parts of wheat gluten/soy flour and starchy materials to produce a bubbly-textured, non-fibrous, end-product. Increased osmotic pressure created by adding water-soluble sugars to the product is said to limit the amount of unbound water available for supporting microbial growth.

U.S. Pat. No. 4,358,468 issued to Dolan et al. discloses a method of cooking vegetable proteins to produce a pet food that resembles lean meat marbled with fat. Shelf stability of this product is achieved by using unspecified amounts of aqueous solutes. This technology does not, however, utilize meat as the predominant ingredient.

U.S. Pat. No. 5,300,312 issued to Lusas et. al. describes another method of processing vegetable protein with other ingredients by extrusion cooking, after which meat products are added to produce an intermediate moisture vegetable food product resembling meat. This method also requires mechanical drying and re-extrusion to produce the final product. This two-step extruded product utilizes a process and ingredients approved by the FDA, rather than the USDA.

The above-described methods are primarily directed toward producing ready-to-eat foodstuffs from vegetable components by extrusion, using equipment commonly available in the cereal industry. Such equipment is not readily available and/or cost effective for use in the meat industry. In addition, extrusion cooking, while effective, presents at least two problems which obviate their use in the meat industry. First, most extrusion cooking devices are made from ferrous materials, which are not allowed in USDA meat plants. Second, extrusion cooking utilizes high pressures and temperature combinations that require delicate process phase end-point temperature determination measurements. Temperature fluctuations are such that proper evaluation of cooking temperature and monitoring food safety aspects of preparation is very difficult.

There is, therefore, a need to produce a fully-cooked, semi-moist, shelf stable meat product using equipment that is cost-effective, more food-safety oriented and USDA approved. The product should be palatable and flavorful, have meat as the primary ingredient, provide a low initial bacteria count, and serve to inhibit the growth of molds, yeast, and other bacteria. Such a product should serve as a stand-alone source of meat protein, or as a meat cooking ingredient, usable in any application requiring cooked meat.

SUMMARY OF THE INVENTION

This invention relates to a method of preparing a fully-cooked, shelf stable, semi-moist meat product ("meat" is defined herein to be any type of animal protein, such as beef, pork, lamb, fish, chicken, etc.) comprising the steps of first admixing a first source of protein and water consisting of animal specie meat with a second source of protein consisting of an isolated source of vegetable protein to obtain a first mixture; second admixing the first mixture with one or more humectants to obtain a second mixture; cooking the second mixture at a temperature of from about 215° F. to about 350° F. to produce a cooked mixture; cooling the cooked mixture to produce an end product; and packaging the end product under anaerobic vacuum.

The first source of protein and water is preferably a primary source of available water in the first mixture and the second source of protein is preferably a primary agent for reducing the amount of available water in the first mixture. The second admixing step may further comprise the addition of food grade, edible acids to the second mixture so as to produce an end product having a pH of less than about 6.0. The cooking step may further comprise the use of a first scraped-surface heat exchanger. The cooling step may further comprise the use of a second scraped-surface heat exchanger, or the use of a cooling tower adaptor for the first scraped-surface heat exchanger. The second admixing step may further comprise the addition of one or more ingredients selected from a group consisting of salts, cures, flavorings, concentrated proteins, fillers, bulking agents, antioxidants, preservatives and antimicrobials so as to further reduce the amount of available water in the first mixture; or the addition of food grade, edible acids to the second mixture so as to reduce the pH of the end product. The cooking step may be conducted at a pressure of less than 30 psi, and may further comprise the constant movement of the second mixture so as to avoid a browning reaction from the first or second source of protein. The packaging step may further comprise the use of an oxygen and moisture impermeable barrier to isolate the end product from the ambient atmosphere, or surrounding the end product with a microbe inhibiting atmosphere having an oxygen-scavenging agent placed therein, or packaged with such an agent. The cooling step may further comprise flashing the cooked mixture to ambient temperature. The humectants may be a secondary source of reducing the amount of the available water in the first mixture to a water activity of less than about 0.86.

The invention disclosed herein also relates to a method of preparing a fully-cooked, semi-moist, shelf stable meat product comprising the steps of: first mixing ground meat as a first source of water with a source of non-meat proteins to produce a first mixture; second mixing the first mixture with protein meals, flours, protein concentrates, protein isolates, protein derivatives, sugars, humectants, flavorings, seasonings, acids, starches, cures, and preservatives to produce a second mixture; cooking the second mixture at a temperature of greater than about 215° F. in a first scraped-surface heat exchanger to produce a cooked mixture; cooling the cooked mixture using a second SSHE to ambient temperature to produce an end product; and packaging the end product under anaerobic vacuum using a moisture and oxygen impermeable means, such as a container, packaging film, or other packaging device.

The invention further relates to a method of preparing a fully-cooked, semi-moist, shelf stable meat product comprising the steps of: first admixing a first source of protein comprising animal specie meat having about 50% to 70% water by weight with a second source of protein consisting of a non-meat protein to obtain a first mixture; second admixing the first mixture with one or more humectants to obtain a second mixture; cooking the second mixture at a temperature of from about 215° F. to about 350° F. to produce a cooked mixture; cooling the cooked mixture to produce an end product; and packaging the end product under anaerobic vacuum. The first source of protein may be selected from a group consisting of beef, pork, lamb, fish, fowl, and krill. The first source of protein may be a primary source of available water in the first mixture and the second source of protein may be a primary source of reducing the amount of available water in the first mixture.

The invention disclosed herein also relates to a method comprising the steps of admixing ground meat as a first source of water with processed high-protein vegetable sources such as protein meals, flours, concentrates, isolates and derivatives of protein sources to produce a first mixture, and then admixing the first mixture with other ingredients, such as sugars, flavorings, seasonings, acids, starches, humectants, cures, and preservatives to produce a second mixture; cooking the second mixture at temperatures of 215° F., or greater, in a first continuous-flow Scraped Surface Heat Exchanger (SSHE) to produce a cooked mixture; cooling the cooked mixture using a second SSHE to ambient temperature to produce an end product; and packaging the end product under anaerobic vacuum, using a suitable moisture/oxygen impermeable container.

The mixture may also be cooled using a cooling tower adaptor to the first SSHE, instead of using a second SSHE. Also, the product may be cooled to temperatures other than ambient in order to accommodate the requirements of various packaging technologies. Colorants, texturizers, and other additives may also comprise a portion of the raw product mixture, as is well known in the art.

One small SSHE system can produce both cooked and cooled product in amounts exceeding 10,000 lbs. per day. The SSHE provides faster cooking with less pressure than extrusion cooking. It does not tear and macerate muscle fibers, and improves product yield, since moisture and fat loss are far less than the 15–20% reduction in product volume that occurs with open cooking methods. Venting of the closed cooking system during pasteurization is recommended to release additional free moisture and steam, resulting in improved shelf stability and product texture in the final product.

Assembly and disassembly of the S SHE for blade inspection and/or replacement is quick and easy. Meat remaining in the auger feed pump, pipelines, or the SSHE itself is easily recovered and, once clear of product, the closed system and piping are easily cleaned with a pump circulation loop for sanitization with equipment in place.

The use of a SSHE also allows the final product to be made in compliance with USDA and FDA equipment requirements. Equipment sanitization is quite efficient, being performable as a Clean-In-Place (CIP) procedure in most production settings, whereby systems are flushed with cleaning solutions and sanitizers without disassembly. The primary exception to CIP is cleaning of the SSHE dashers (mixing blades), which require disassembly and thorough cleansing due to buildup of proteins and baked-on food components.

Finished fully-cooked, semi-moist, shelf stable meat products resulting from the claimed method of production offer the following performance:

(a) an aerobic plate count of less than 10,000 CFU/g (colony forming units per gram of product);
(b) less than 10 CFU/g of yeast and molds;
(c) test negative for Saureus and Salmonella;
(d) less than 3 colonies/g of $E.\ coli$;
(e) final stable pH of less than approximately 5.0;
(f) water activity of less than approximately 0.86;
(g) microbial challenge studies indicating that pathogen inoculation results in decline and destruction of the injected microbe population; and
(h) less than 100,000 CFU/g of thermophilic aerobic spores.

The invention also relates to a food product prepared by the method described above. The product may be in the form of cooked meat, or various meat products, such as chile, pizza toppings, meat spreads, sticks, sausages, molded or formed meats, pastes, pies, enrobed snacks, meat bars, meat crumbles, or loaves. Additional advantages and features of the present invention will become apparent to those skilled in the art of food preparation by way of the following discussion.

BRIEF DESCRIPTION OF THE DRAWINGS

An expanded method flowchart for processing animal specie meat and other ingredients to produce a fully-cooked, semi-moist, shelf stable meat product.

DETAILED DESCRIPTION OF THE PREFERRED EMBODIMENT

The SSHE is a specialized piece of heat transfer equipment that was developed to provide a more efficient freezer for making ice cream. The original design incorporated a scraping action to prevent buildup of frozen ice cream on heat transfer surfaces. The concept was thermally efficient, and later improved to increase production capacity. The SSHE may also be used in heating applications, where the product is heated in a continual flow with scraping action that removes the product from hot surfaces before "burn on" can occur. a modem SSHE is capable of processing products containing particulate units of up to 1 inch in diameter without excessive breakage.

A SSHE generally comprises at least one jacketed cylinder fitted with a rotating shaft on which scraper blades are mounted. Food products are pumped through the cylinder while heating or cooling media is circulated in the annular space between the cylinder and its surrounding jacket. The blades are fixed to pins which allow them to swing freely. Centrifugal force holds the blades in position against the inside of the cylinder wall as heated product is swept away from the heat transfer surface and new product is exposed to treatment.

The standard horizontally-oriented exchanger generally has from one to three independently functioning jacketed cylinders mounted on a heavy steel base. a stainless steel casing covers the cylinders, base, and scraper drives to form a completely enclosed system. Vertical units are available to conserve floor space. The method of manufacturing shelf stable semi-moist meat includes the use of up to two cylinders, with product being piped and pumped through the system. Cylinder "one" is used for heating the product to pasteurization temperature while cylinder "two" is used during the cooling phase. a more costly alternative is to install a cooling tower and vent system adapted to the first cylinder for cooling the product, eliminating the need for cylinder "two". It should be noted that a SSHE does not act as a pump. a separate pump is required to move product through the unit and, depending on the length and size of the system, multiple pumps may be required for timely product movement.

The shaft which carries the scraper blades is called a dasher by some manufacturers and a mutator by others, the "dasher" terminology being derived from early days when the exchanger initially was used as an ice cream freezer. Dashers are engineered to achieve a high coefficient of heat transfer with minimum power consumption and are supported by bearings located outside the product contact zone. Standard designs accommodate different product viscosities, dwell times, levels of blending, and sizes of particulate. Typical dasher speeds vary from 60 to 420 RPM, with standard motors providing a choice of three drive methods: directly-driven hydraulic, belt-driven electric, or direct-driven gear head. a SSHE can be equipped with different diameter dashers. The larger the dasher diameter, the smaller the annular space in which the product travels, which improves heat transfer.

SSHE units can normally handle product mix viscosities of up to 1,000,000 centipoise (CPS), and a particle size of up to one inch in diameter; to increase the effectiveness of heat transfer it is recommended that high viscosity mixes be used to help move large particles through the exchanger cylinders. Higher dasher speeds are also encouraged when manufacturing semi-moist meat products to allow the meat to flow and tumble with the dasher, rather than turning with it as a massed clump. Constant movement of the product mixture (i.e. flowing and tumbling) enhances heat transfer efficiency and avoids a Malliard (browning) reaction from the sources of protein in the mixture. In addition, this type of product movement contributes to one of the major advantages of the process described herein over other heat transfer methods used to pasteurize meat—the SSHE tends to produce a product texture which more closely approximates a whole muscle product because it does not tend to shear the meat.

Scraper blades are designed to promote the rapid removal of product from cylinder walls while enhancing product agitation and mixing; blades are available in a selection of materials and configurations. The most commonly used material is stainless steel, since the blade is the wearing part and as such, must be softer than the cylinder wall or lining. Blade mechanical configuration is generally determined by product temperature, pressure and formulation, as well as by the cylinder material and service media (i.e. heating/cooling media within the jacket) being used, as is well known in the art. The SSHE heat exchange cylinder inner diameter is usually 6 inches, with standard lengths established at 48" or 72". There are, however, other sizes available. Cylinders are fabricated from stainless steel, nickel, or a bimetallic combination. The cost per square foot of heat transfer surface is higher for a SSHE than other types of heat exchangers. It is essential, therefore, that the cylinder material with the highest feasible heat transfer coefficient be selected. This selection, however, must be tempered by considerations of compatibility between cylinder and scraper blade materials, and the susceptibility of the materials to acid attack and corrosion by the ingredients being processed. Bimetallic cylinders offer advantages for use in the processing of semi-moist meat because they are made by centrifugally casting a hard, corrosion-resistant alloy (nickel, chromed nickel, or stainless steel) inside a tube which has high tensile strength and thermal conductivity. The lining is hard enough to withstand abrasion from both stainless and plastic scraper blades. However, such inner alloy coatings are susceptible to strong acid corrosion and may have to be replaced after periods of extended use.

The common (heat transfer) media used in a SSHE are water, steam, oils and refrigerants. Refrigerants consist of ammonia and other gas-type coolants. Each heat transfer substance requires a slightly different cylinder jacket design for optimum performance, as is well-known in the art.

Jackets designed to contain water or other liquid media have a relatively small spacing between the jacket and heat exchange cylinder. This induces high media velocities, turbulence, and improved heat transfer efficiency. It also minimizes the amount of "burned on" product. Normally, counter-current flow is recommended between product and media to increase the heat transfer efficiency. In many cases, however, because of the high flow rate of media over product and the high temperature differences between media and product, the increase in performance of counter-current over co-current flow is small. Product flow may also be slowed down, or temperatures increased, to enhance heat transfer.

Units which use steam as the heat transfer medium require a header that distributes the steam over the entire length of the cylinder. Condensate runs to the bottom of the jacket where it is collected and removed by a steam trap. Direction of product flow is immaterial.

Ammonia, Freon, or other gas-type media, used for cooling, are handled differently by various manufacturers. Most exchanger designs involve feeding such media into the bottom of the jacket for boiling within. Since the key to efficient heat transfer is to maintain a wetted cylinder surface, not all the refrigerant is allowed to evaporate. a combination of gas and liquid (i.e. boiling medium) is carried over into a surge tank, where the phases are separated and the liquid recycled to the bottom of the jacket. Liquid level is maintained by a valve that allows additional liquid to enter the surge tank, replacing that which has evaporated, as is well known in the art.

The typical meat cooking system of the present invention consists of a single auger feed hopper/blender with a leveling ribbon, followed by a pump and a two-cylinder SSHE, one cylinder filled with 275° F. steam and the other with 0° F. ammonia. Exemplary equipment includes an APV Crepaco model 15DR hopper/blender, or other meat blender with a leveling ribbon, followed by an APV Crepaco No. 6 (or larger size) rotary pump, or equivalent unit, and then by an in-line, two-cylinder SSHE, such as the APV Crepaco model 2HD-648 with water flow seals. Approximately fifteen to thirty pounds of steam pressure will be required in the first cylinder to achieve a cooked product mixture temperature of 230° F. (as a safety factor which takes into account heat loses in piping and the other equipment), which is necessary to effect pasteurization of the meat. Steam or hot oil is typically used in the first cylinder to heat the product mixture to temperatures above 215° F. Ammonia in the jacketed area of the second cylinder may then be used to cool the mixture. The temperature of the ammonia should be about –40° F. upon entering the jacketed cylinder. In the system and process described herein, the mixture temperature will be reduced to below 50° F. within 2 minutes. The cooling rate can be altered by reducing the ammonia temperature or the mixture transit speed.

The following data represents typical mechanical data process parameters associated with the use of an APV Crepaco HD648 SSHE in the process and system described herein:

| | |
|---|---|
| Auger Pressure (PSIG) | 20 |
| Pressure to SSHE (PSIG) | 150 |
| Temperature Out (F) | 210 |
| Steam Pressure (PSIG) | 10 |
| Product Flow Rate (lbs/min) | 22 |
| Flashed Temperature (F) | 210 |

While any similar units may be used, the hopper/blender and pump should be designed specifically to move viscous, sticky, coarse products directly into a SSHE. Both the auger feeder and SSHE are preferably driven from a central hydraulic power source. After the meat (preferably 80% lean, 20% fat, but may be other combinations thereof) is ground, spiced and blended, it is moved to the SSHE using the auger/feeder and rotary pump at a rate of approximately 22 pounds per minute. Such movement preferably requires using stainless steel, food grade, USDA approved, 3 inch ID (or greater) pipe to transfer all products within the system.

The auger/feeder unit, such as the APV Crepaco 10SA Single Auger Feed Unit, or similar feeder device, propels the raw product mixture into the SSHE. The auger maintains a constant stuffing pressure at the rotary pump inlet by varying its operating speed, while a leveling ribbon maintains a uniform meat level in the feed hopper. While referred to throughout this description as a single auger, in reality, two augers are normally used. The first auger moves the mixture (using the blender ribbons) to the exit doors of the blender. The mixture then falls the second auger, which transports it to the pump inlet. It is at this point that the product begins to move through the stainless steel piping system under pressure.

The dasher design should be selected to promote rapid removal of the product from cylinder walls and enhance agitation and mixing during the cooking and cooling phases. APV Crepaco-manufactured dashers of preferably Series 45 or greater (4.5 inches in diameter) may be used with the viscous particle sizes typical of the product described herein. Dashers should be engineered to achieve high heat transfer coefficients with minimum power consumption and are supported by heavy duty bearings located outside the product contact zone. Size 30, 45, and 55 dasher designs (3.0, 4.5, and 5.5 inches in diameter, respectively) provide product flow spaces (the space between the dasher blades and the cylinder wall) of different sizes to accommodate different product viscosities, product dwell time in the heat exchanger cylinder, and meat particle size. For heavy plasticizing compounds, such as meat proteins, internal water circulation to reduce adhesion of product to the dasher may be necessary.

Dasher speeds may be varied from about 20 to about 500 RPM. Most preferably, and in accord with the fat content of the product, and the product particle size, the dasher speed will range from about 30 (30% fat/one inch particles) to 420 RPM (2% fat/emulsion). Lower speeds will protect the product quality (by reducing the amount of shearing), but lower the heat transfer efficiency of the SSHE. The proper combination of dasher size and speed is normally assigned at the time the product is introduced into the SSHE, and is based on the product formulation and recommendations by the manufacturer, as is well known in the art. The distance between the underside of the blade and the dasher shaft should be equal or greater than the largest particle to be processed. This will allow passage without particle damage as the blade sweeps by and maintains integrity of the sample. a dasher size of 4.5 inches is recommended for a 6 inch diameter cylinder, using the formulations described herein. Dasher blades should also be made from stainless steel (for high viscosity meat products). Various coating metals, such as nickel, chrome-nickel, and bimetallic combinations may also be used if approved by USDA.

Flashing is the discharge of steam and moisture during cooling of the product at normal atmospheric pressure. The mixture will normally be flash-cooled to 200° F. (out of the first SSHE discharge piping) using a second SSHE cylinder; flashing can also be used to cool the cooked mixture to ambient temperature. Similar results can be obtained using a cooling tower assembly as an in-line addition to the discharge pumps immediately after the SSHE cooking step. Both procedures will allow needed moisture flashing. The resulting product that is not packed immediately, due possibly to mechanical downtime, may be shunted via additional pumps and piping back to the augers for recooking and later packaging, since recooking does not greatly affect the final texture, flavor, and integrity of the finished product.

The principles involved in the use of a SSHE are based on constant movement of the product away from the heat exchanger surfaces to minimize the formation of films that lessen heat transfer, contribute to build-up on the equipment, or transfer an unpalatable flavor to the finished product. Four types of thermal exchange must be taken into account during the cooking process: sensible heat (heat produced by the increase/decrease in temperature of the product without change of state); latent heat (heat exchange associated with a physical change in the material being processed); heat of reaction (heat that is given off or taken up when two or more products react); and mechanical heat (power consumed in turning the dasher of a SSHE—mostly absorbed into the product within the exchanger and increases the efficiency of heat transfer).

The ideal form of heat transfer occurs when one product, at an elevated temperature, is brought into direct contact with another material at a lower temperature. The warmer product gives up heat without loss of energy and at a rate equivalent to the ability to mix or disperse the two materials. In practice, however, it is rare that two materials may be brought into direct contact. As a general rule, there is an intervening heat transfer surface such as a tank or tube wall. This surface impairs the heat transfer process because it resists the passage of heat. It also provides mechanical resistance via friction and the buildup of deposits or films (which further retard the passage of heat). In the majority of applications, heat of reaction does not occur. Eliminating this factor in the generally accepted formula for calculating the heat exchanger surface area needed in a SSHE process as follows:

$$A_{HT} = \frac{R_{FL} * (T_{IN} - T_{OUT}) * (SpHt + LH + HP) * 2545 \text{ Btu/hr/HP}}{U \times LMTD}$$

where:

$$LMTD = \frac{(T_{IN} - T_{MO}) - (T_{OUT} - T_{MI})}{\ln \frac{(T_{IN} - T_{MO})}{(T_{OUT} - T_{MI})}}$$

For steam, ammonia, and freon units, assume $T_{MI}=T_{MO}$.

$A_{HT}$=surface area required for heat transfer to product (ft$^2$)

$R_{FL}$=product flow rate (lbs/hr)

$T_{IN}$=temperature of product into the SSHE cylinder (F)

$T_{OUT}$=temperature of product out of the SSHE cylinder (F)

SpHt=specific heat (F)

LH=latent heat removed from fat crystallization (Btu/hr)

HP=dasher drive horsepower (Use only in cooling application, disregard for heating; note that horsepower is converted to Btus by the conversion factor 2545 Btu/hr/HP)

U=heat exchange conductance value for particular SSHE used (Btu*ft$^2$*F/hr)

LMTD=log mean temperature difference $T_{MI}$=temperature of media into SSHE jacket (F)

$T_{MO}$=temperature of media out of SSHE jacket (F)

The present invention arose from a desire to provide an alternative meat product that retains the taste and mouth-feel properties of freshly prepared seasoned ground beef (or other species of animal meats), is microbiologically safer than conventionally cooked meat products, and does not require refrigeration. The method of the present invention produces fully-cooked, semi-moist meat products having a prolonged shelf life by: (1) mixing common ingredients with raw meat that act as antimicrobials or bacteria growth suppressors, (2) choosing other ingredients to add to the mixture for controlling end-product water activity, (3) cooking the mixture at temperatures which produce pasteurization, and (4) controlling package atmosphere.

Referring now to the process figure, the method of preparation begins with admixing a first source of protein and water consisting of animal specie meat (any species of suitable animal protein) with a second source of protein consisting of an isolated source of vegetable protein (e.g. vegetable particulates, flours, isolates, concentrates, or other extendable protein sources) to obtain a first mixture, as indicated at Step 20. The resulting first mixture is then admixed with water replacing compounds, or humectants, to produce a second mixture, as shown in Step 30. This second mixture is then moved to a first SSHE (Step 40) and cooked at temperatures of from about 215° F. to about 350° F. (Step 50) to produce a cooked mixture. The second mixture is preferably moved to the SSHE for cooking under continuous positive vacuum flow at a consistent internal product temperature of 215° F. or greater, in order to produce pasteurization. After cooking, the mixture is preferably moved to a second SSHE (Step 60) and cooled to a suitable temperature (Step 70), preferably ambient, to produce an end product. The end product is then moved from the second SSHE to a packaging station, as shown in Step 80, and packaged under anaerobic vacuum, as shown at Step 90, preferably within an oxygen and moisture/microbe impermeable barrier. The resulting fully-cooked meat product remains intact with some loss of protein content, but not an overall distinguishable change in the remaining protein structure (i.e., proteolysis and Malliard reactions which usually occur during high temperature cooking are eliminated by the process disclosed herein). Oils or fats may be added to the product during cooking to further extend shelf life and influence the texture of the finished product. Flours, protein concentrates, isolates, salts, colorings, antioxidants, antimicrobial agents, plant fibers and starches may also be added for these purposes, as is well known in the art.

The microbiological spoilage of food involves the multiplication of yeast, mold and bacteria. Reducing the initial number of microorganisms present in the finished product minimizes the extent of future microbial growth and prolongs shelf life. According to the method of the present invention, this is accomplished primarily through heat pasteurization. The secondary microbiological stabilizer utilized in the method of the present invention is to control available water in the final product so as to fall within a range of 20% to 30% by weight. Salts and sugars, which act synergistically to increase the organoleptic qualities of the meat flavor, are also used to control the moisture level of the final product.

A number of other ingredients, including flavorings, colors, preservatives, sweeteners, salts, cures, fillers, bulking agents, edible acids, antimicrobials, antioxidants, concentrated proteins, emulsifiers, fats and oils, polyhydric alcohols, and other ingredients well known in the art are also usually mixed with the first mixture during the second mixing step to further reduce the amount of available water in the first mixture, and to produce other desired end-product characteristics. All added ingredients must be edible and approved by either the USDA or FDA.

Specific components of the over-all strategic approach to producing the fully-cooked, semi-moist, shelf stable product of the present invention include: water activity control by food chemical additives and product cooking, pH control, product pasteurization, anaerobic packaging, and inhibition of lipid oxidation. Water activity is the measurement of how tightly water is bound, structurally or chemically, in food products. It equals the relative humidity of air, at equilibrium with a sample, in a sealed measurement chamber.

The first source of protein serves as the primary source of available water in the first mixture; the second source of protein serves as the primary agent for reducing the amount of available water in the first mixture. Humectants, used to further reduce the amount of available water in the first mixture during the second mixing step, may be selected from a group which includes: sodium chloride, sodium citrate, corn syrup, glycerol, soy ingredients, maltodextrins, corn starches, polyhydric alcohols, spices and flavorings, gums (natural and artificial including agar, algin, alginates, carrageenan, cellulose, microcrystalline, fiber, dietary fiber, oats and oat products), hydrocolloid, modified food starches, gluten products, flours, proteins (including concentrates, enzyme modified flour, grits, isolates, spun fibers, textured mechanically separated species meat), whey proteins, pectins, animal and vegetable protein, analogs, food plasticizers, acidulants, bulking agents (dietary fiber, dextrins, polydextrose, etc.), casein and caseinates, milk protein hydrolysates, milk and milk fat enzyme modified dairy replacers, enrichments, extracts, firming agents, flavor enhancers, fruit pulps and purees, gelling agents, glycerine, chemical humectants (including 1,3-butylene glycol, mannitol, propylene glycol, sodium lactate, sorbitol, invert sugars), lactalbumin, hydrolysates (including animal, cereal solids, milk, vegetable, whey fruit), meat, poultry, fish and bone stocks, stabilizing colloids, other starch products (including regular, modified, and pregelatinized).

Water activity is an important factor in preventing *C. botulinum* growth. The minimum available water (Aw) that permits growth and toxin production of *C. botulinum* is 0.92. An end-product of approximately Aw<0.85 is needed for microbial safety (per FDA/USDA mandate). Humectants, added during the second mixing step of the process, serve as a secondary source of reducing the amount of available water in the first mixture to approximately 0.85, or less. Cooking the product to an internal temperature of 215° F. or greater using a SSHE, flashing off moisture and rapid cooling (using a cooling tower or additional SSHE) to reduce the available moisture is also used in the method of the present invention as a means to restrict microbial growth.

The effects of acids on inhibiting microbial growth are widely known in the food industry. Food grade, edible acids such as acetic (vinegar), citric, lactic, fumaric, and ascorbic can all be added during the second mixing step to reduce the pH of the end product (less than about 6.0), and help achieve an end product pH of less than about 5.2. For fermented and cooked meat products, solutions of encapsulated glucono-delta-lactone (GDL) can also be used. The encapsulated GDL is not activated until heat processing, which initiates fermentation and acid production.

Shelf stable meats such as canned meats, prefried canned bacon, luncheon meats, hams, and pork shoulders can be heat treated via pasteurization to reduce vegetative bacteria spores. These products are usually heated for some amount of time to a temperature of at least 233° F. to insure that an internal temperature of 215° is reached for the destruction of most vegetative cells; however, only a partial destruction of *C. botulinum* spores may be accomplished in this manner. While this cooking process can be used to ensure the safety and stability of low acid canned foods (i.e. provides at least a 12D reduction in heat-resistant spores of *C. botulinum*, where a "D" value in the food industry equals a 90% reduction of the microbial population present), additional methods, such as adding salts and nitrites, must be used in conjunction with heat treatment to provide safety from botulism for the shelf stable product disclosed herein. It is a high acid food, which requires curing and salting so as to be reduce the levels of *C. botulinum* growth to within the controlling capability of lowered water activity. Inhibition of *C. botulinum* is also accomplished in processed meats using a 3.8% salt concentration in the water phase meat product, which may be reduced to 2.5% by the addition of nitrites (100 ppm or greater).

Several anaerobic packaging methods can be used to actively modify the atmosphere surrounding the final product. These include vacuum packaging, the use of oxygen absorbents, carbon dioxide generators, ethanol vapor generators, and injection of gas mixtures, commonly known as gas packaging.

Vacuum packaging is used extensively by the meat industry to extend product shelf life. The product is placed within a plastic packaging film of low oxygen permeability, air is removed under a vacuum and the package is sealed. Under good vacuum conditions, headspace oxygen is reduced to 1% or less, while the amount of carbon dioxide produced by the meat tissue and microbial respiration eventually increases to occupy 10–20% within the package headspace. These conditions, i.e., low headspace oxygen and elevated carbon dioxide levels, extend the shelf life of meat by inhibiting the growth of aerobic meat spoilage microorganisms, particularly Pseudomonas and Alteromonas species.

Another method of active headspace atmospheric modification is by surrounding the end product with a microbe-inhibiting atmosphere through the use of oxygen absorbents/carbon dioxide generators. These consist of sachets, like a desiccant, which are placed inside the packaged product. Various types of agents are available to absorb/scavenge oxygen and generate equal volumes of carbon dioxide within the package headspace atmosphere. a similar concept makes use of ethanol vapor generators to modify the gas atmosphere by the production of ethanol vapor within the package headspace. Both oxygen absorbents and ethanol vapor generators have been used to extend shelf life.

The most common method of active headspace atmosphere modification is gas packaging, which is simply an extension of vacuum packaging technology and involves the evacuation of air followed by direct injection of the appropriate gas mixture.

The success of any packaging technology is dependent on the packaging material permeability characteristics. Developments in polymer chemistry have resulted in the production of packaging films, such as polyvinylidene chloride (PVDC), and ethylene vinyl alcohol (EVOH). Both films have excellent water vapor and gas barrier characteristics and can be laminated to other polymers, providing desirable strength, heat sealability and permeability characteristics.

Packaging films for cooked, non-respiring meat products such as shelf stable meat should include an outer layer of nylon (for toughness and increased impermeability), with gas and moisture vapor impermeability provided by EVOH or PVDC, and heat sealability provided by polyethylene (PE).

The initial numbers and types of organisms present in a cooked food product influence the antimicrobial effect of the packaging film. It has been shown that carbon dioxide is most effective against common aerobic spoilage microorganisms such as Pseudomonads and Acinetobacter/

Moraxella. For a pasteurized product, almost none of these organisms are found. Vacuum packaging is effective against future aerobic spoilage microorganisms, but others, such as Enterobacteriaceae or microaerophilic lactic acid bacteria, may survive. The further use of acids, cooking pasteurization temperatures, salts, low water activity and other antimicrobials will, along with the packaging material, further prevent growth of these possibly pathogenic organisms.

Anaerobic bacteria, such as the food poisoning organisms *C. botulinum* and *C. perfringens* may not be affected by vacuum packaging. Pasteurization: acids, low water activity, and antimicrobial food ingredients such as meat cures further inhibit the growth of these toxin producing microorganisms. Additionally, the recent FDA/USDA approval of sodium citrate as an anti-*C.botulinum* ingredient will prevent toxin buildup where residual spores of this bacterium exist. Microbial challenge tests performed on the shelf-shelf stable products produced using the method described herein showed that the end-product was not able to support any significant microbial activity.

a synergistic antioxidant system made up of ascorbyl palmitate, alpha tocopherol (vitamin E), butylate hydroxyanisol (BHA), butylate hydroxy toluene (BHT), and oil of rosemary extract are organoleptically acceptable as a means of preventing oxidative rancidity (i.e. inhibiting lipid oxidation) in the meat product after cooking. The use of other chelating agents, such as Vitamins a, D, E, K or antioxidant herbal extracts can also prevent a warmed over flavor in the cooked meat product.

EXAMPLES

The following formulations represent various combinations of ingredients, which, when processed according to the method of the present invention, will result in a fully-cooked, semi-moist, shelf stable meat product.

Example 1

This example represents the generalized formula for a semi-moist, shelf stable meat product.

| PRODUCT INGREDIENTS | PERCENT PRODUCT TOLERANCE |
| --- | --- |
| Animal or plant protein (primary protein ingredient) | 25–70 |
| Plant protein (as a texturing and flavoring source) | 10–50 |
| Vegetable puree (acidulant and flavor component such as tomato, beets, or equivalent) | 2–20 |
| Vegetable fiber (oat, wheat, rice, barley or other equivalent source of bran) | 2–10 |
| Spice blend (commercial meat flavored or other equivalent) | 3–6 |
| Corn syrup solids (or any dextrose equivalent) | 1–15 |
| Food grade humectant (glycerol or equivalent) | 1–4 |
| Acidulant (acetic, fumaric, lactic, citric, adipic, gluconic, tartaric, succinic, calcium propionate or other equivalent acids) | 1–10 |
| Maltodextrin | 1–15 |
| Modified corn starch (or equivalent plant or chemical starch) | 1–15 |
| Sorbitol (or equivalent polyhydric alcohol) | 1–5 |
| Salt (sodium chloride or potassium chloride) | 1–5 |
| Animal or plant flavor extracts (used as flavor to taste) | 1–10 |
| Sodium lactate | .5–5 |
| Sodium citrate | .5–5 |
| Sodium benzoates (or equivalent antimicrobials) | .5–5 |
| Monoglycerides with sodium stearoyl lactate (or equivalent antimicrobials) | .5–5 |
| Optional food grade acidulant (such as citric, lactic, | .1–2 |

-continued

| PRODUCT INGREDIENTS | PERCENT PRODUCT TOLERANCE |
| --- | --- |
| or equivalent, to taste) | |
| Antioxidant (vitamins a, D, E, K; herb extracts; BHA; BHT; and other food industry antioxidants) | .001–2 |
| Curing ingredients and adjuncts (such as sodium nitrite, sodium nitrate, sodium erythorbate, or equivalent) | .001–1 |

Example 1 Preparation

The first source of protein (e.g. beef containing approximately 30% fat) is ground through a ⅛–1 inch grinder plate and placed into a single feed hopper/blender with a leveling ribbon for mixing. Prepared meat, such as frozen flaked, bowl chopped, mechanically deboned specie product (MDSP), or other suitable animal specie meat product may also be used. The second source of protein, which can be a plant protein, such as soy protein concentrate or soy protein isolate powder, is then added to the meat and fat blend, which is also mixed with an additional amount of lean ground beef to increase water molecule binding capacity. The addition of lean beef at this point allows salt soluble heat coagulative proteins to bind to the soy flours, and extract moisture from the primary source of protein. The use of soy protein isolate (instead of soy protein concentrate) is recommended to maximize water binding capacity.

Puree, made from tomatoes or other acidic fruits or vegetables, vegetable fiber, spice blend, antimicrobials, monoglycerides with sodium stearoyl lactate, salt, flavor extract, antioxidants, and curing ingredients and adjuncts are then added to the meat, fat and soy isolate combination and mixed for 10 minutes. This induces the meat, which contains salt-soluble heat coagulative proteins that are activated by salt, to release protein molecules which can be bound by other ingredients. Antimicrobials, flavors, cures, etc. (those ingredients that function at the molecular level) are therefore added first in order to achieve the maximum amount of binding for these free-molecular ingredients. After binding occurs, the remaining water must also be bound to make this compound unavailable for bacteria. Humectants and water displacers, such as dextrose, optional food grade acidulants, maltodextrin, starch, and polyhydric alcohol are then added and blended for an additional 10 minutes.

The second mixture is then pumped into the SSHE and heated to an internal temperature of at least 215°, while undergoing constant agitation in the first SSHE cylinder. The resulting cooked mixture is then passed into the second SSHE cylinder and cooled. a pump for moving viscous material, such as an APV Crepaco No. 6 pump, or similar pumping unit, is used to direct the resulting blended, raw product mixture at a rate of approximately 22 pounds per minute to an auger feeder unit, such as the APV Crepaco 10SA Single Auger Feed Unit, or similar feeder device, which then propels the raw product mixture into a SSHE. a suitable SSHE unit to carry out the method of the present invention is the APV Crepaco HD648, or similar SSHE device. Fifteen pounds of steam pressure in the SSHE jacket are required to achieve the necessary temperature of 230° F. for product pasteurization, to make up for the loss of BTU's due to metal, air, product absorption, etc.

After cooling to an internal temperature of 125° F., or less, the product is pumped from a discharge pipe and allowed to flash cool (the discharge of steam and moisture during cooling of the product at normal atmospheric pressure). The final or end-product is then packaged under anaerobic vacuum. The resulting products look and smell like flavored cooked meat, even after prolonged storage periods.

After packaging at room temperature, the resulting meat product contains 25% or less moisture (as determined by American Association of Analytical Chemists approved methods) at an $A_w$ of approximately 0.82, and a pH of approximately 5.0.

Suitable meat ingredients such as beef, pork, lamb, fowl (e.g. chicken, turkey, etc.), fish, krill, shrimp and others can be substituted into the process as a replacement for the animal specie meat mentioned above. End product taste, texture, appearance, and aroma will be similar to cooked and seasoned meat. The components of the method disclosed herein, working synergistically, result in a product with a non-refrigerated shelf life of 12 months or longer.

Example 2

A specific formulation, based on the general formula offered in Example 1, for producing a meat product which tastes like seasoned beef is as follows:

| PRODUCT INGREDIENTS | PERCENT BY WEIGHT |
| --- | --- |
| Ground Beef (70% or 80% Lean, 30% or 20% Fat) | 32 |
| Soy Protein Isolate | 15 |
| Lean Ground Beef (90% Lean, 10% Fat) | 12.0 |
| Tomato Paste | 5.50 |
| Oat Bran | 2.23 |
| Spice Blend | 6** |
| Corn Syrup Solids (40 to 60 Dextrose Equivalent) | 5 |
| Food grade glycerin | 4.5 |
| Vinegar | 3 |
| Maltodextrin | 3 |
| Modified Corn Starch | 3 |
| Sorbitol | 2.23 |
| Salt | 1.5 |
| Beef Extract | 1.5 |
| Sodium Lactate | 1.5 |
| Sodium Citrate | 1.5 |
| Total amount of antimcrobials | 3.0 |
| Monoglycerides with Sodium Stearoyl Lactate | 1 |
| Citric Acid | .5 |
| Lactic Acid | .5 |
| Herbalox ® (spice extract with oil of rosemary) | .04 |
| BHA | .0015 |
| BHT | .0015 |
| Sodium Nitrite | .0067 |

**¹Basic Spice Blend, as a percentage of spice weight (add 6 lbs. per 100 lbs. of pre-blend):
Minced Onion (dehydrated) 15.50
Tomato Paste 16.05
Chili Powder 18.00
Anaheim Red Pepper 11.78
Salt 10.00
Sodium Phosphate 4.00
Comino 7.00
Bell Pepper 5.30
Black Pepper 4.70
Garlic Powder 3.92
Jalapeno Pepper 2.00
Mustard Powder 1.00
Mexican Oregano 0.75
**²Alternative Spice Blend, as a percentage of spice weight (add 8 lbs. per 100 lbs. of pre-blend):
Chili Powder 30.00
Vinegar (100 Grain) 20.00
Minced Onion (dehydrated) 17.50

-continued

| PRODUCT INGREDIENTS | PERCENT BY WEIGHT |
| --- | --- |
| Salt 10.00 | |
| Black Pepper 6.70 | |
| Sodium Phosphate 4.00 | |
| Garlic Powder 3.25 | |
| Spanish Paprika 2.90 | |
| Cumin 1.90 | |
| Oregano 1.50 | |
| Cayenne Pepper 1.25 | |
| Corn Syrup Solids 1.00 | |

Example 2 Preparation

In Example 2, beef containing approximately 30% fat is ground through a ⅛–1 inch grinder plate and added to the single feed hopper/blender with a leveling ribbon for mixing. Soy protein concentrate or soy protein isolate powder is added to the meat and fat blend.

An additional amount of 90% lean ground beef is then blended with the primary source of protein (70% lean beef in this example) and soy flour mixture. Tomato paste, oat bran, one of two suggested spice blends (listed above), salt, beef extract, sodium lactate and sodium citrate, monoglycerides with sodium stearoyl lactate, Herbalox®, BHA, BHT, and sodium nitrite are then added to the meat, fat and soy isolate combination and mixed for 10 minutes. The product is then blended for an additional 5 minutes. Corn syrup solids, glycerine, vinegar, maltodextrin, modified corn starch (e.g. Mira Gel®), sorbitol (or equivalent alcohol sweetener), citric and lactic acids are then added and blended for an additional 10 minutes. The viscous raw product mixture is then pumped to the auger feeder unit, where it is moved on to the primary SSHE, which provides constant agitation of the product mixture as it cooks. An internal product temperature of 215° F. must be reached to insure proper pasteurization of the meat. The cooked product is then pumped through a second in-line SSHE to initiate cooling action. After cooling the cooked product to an internal temperature of 125° F., or less, it is pumped from a discharge pipe and allowed to flash cool to ambient temperature. The product is then packaged in a suitable vacuum packaging material immediately upon release from the system to prevent unwanted contamination of the cooked/pasteurized product. The resulting product looks and smells like freshly cooked, flavored beef.

Example 3

The specific formulation of a "beef stew" flavored product variant is as follows:

| PRODUCT INGREDIENTS | PERCENT BY WEIGHT |
| --- | --- |
| Ground Beef (70% Lean, 30% Fat) | 32 |
| Dehydrated Potatoes, Carrots, and Turnips | 15 |
| Lean Ground Beef (90% Lean, 10% Fat) | 12.0 |
| Tomato Paste | 4.50 |
| Oat Bran | 2.23 |
| Commercial Meat Flavored Spice Blend | 6 |
| Corn Syrup Solids (40 to 60 Dextrose Equivalent) | 5 |
| Glycerol | 4.5 |
| Vinegar | 2 |
| Maltodextrin | 3 |
| Modified Corn Starch | 3 |
| Sorbitol | 2.23 |
| Salt | 1.5 |
| Beef Extract | 1.5 |

| PRODUCT INGREDIENTS | PERCENT BY WEIGHT |
| --- | --- |
| Sodium Lactate | 1.5 |
| Sodium Citrate | 1.5 |
| Total amount of antimcrobials | 3.0 |
| Monoglycerides with Sodium Stearoyl Lactate | 1 |
| Citric Acid | .5 |
| Lactic Acid | .5 |
| Herbalox ® | .04 |
| BHA and BHT | .0015, each |
| Sodium Nitrite | .0067 |

Example 3 Preparation

In Example 3, beef containing approximately 30% fat is ground through a ½ inch grinder plate and added to the single feed hopper/blender with a leveling ribbon for mixing. Equal amounts of dehydrated potatoes, carrots, and turnips are also ground and added to the meat and fat blend.

An additional amount of 90% lean ground beef is then blended with the primary source of protein (70% lean beef in this example) and dehydrated vegetables. Tomato paste, oat bran, commercial spice blend, salt, beef extract, sodium lactate and sodium citrate, monoglycerides with sodium stearoyl lactate, Herbalox®,BHA, BHT, and sodium nitrite are then added to the meat, fat, and dehydrated vegetable combination and mixed for 10 minutes. The product is then blended for an additional 5 minutes. Corn syrup solids, glycerine, vinegar, maltodextrin, modified corn starch, sorbitol, citric and lactic acids are then added and blended for an additional 10 minutes. The viscous raw product mixture is then pumped to the auger feeder unit, where it is moved on to the primary SSHE, which provides constant agitation of the product mixture as it cooks. An internal product temperature of 215° F. must be reached to insure proper pasteurization of the meat. The cooked product is then pumped through a second in-line SSHE to initiate cooling action. After cooling the cooked product to an internal temperature of 125° F., or less, it is pumped from a discharge pipe and allowed to flash cool to ambient temperature. The product is then packaged in a suitable vacuum packaging material immediately upon release from the system to prevent unwanted contamination of the cooked/pasteurized product. The resulting product looks and smells like freshly cooked, flavored beef stew.

Example 4

The specific formulation of a "Mexican flavored" rice and beans product variant is as follows:

| PRODUCT INGREDIENTS | PERCENT BY WEIGHT |
| --- | --- |
| Fully Cooked Pinto Beans and/or White Rice | 32 |
| Beef Flavored Textured Soy Isolate | 15 |
| Lean Ground Beef (90% Lean, 10% Fat) | 12.1 |
| Tomato Paste | 4.50 |
| Oat Bran | 2.23 |
| Commercial Mexican Flavored Spice Blend | 6 |
| Corn Syrup Solids (40 to 60 Dextrose Equivalent) | 5 |
| Glycerol | 4.5 |
| Vinegar | 2 |
| Maltodextrin | 3 |
| Modified Corn Starch | 3 |
| Sorbitol | 2.23 |
| Salt | 1.5 |

| PRODUCT INGREDIENTS | PERCENT BY WEIGHT |
| --- | --- |
| Beef Extract | 1.5 |
| Sodium Lactate | 1.5 |
| Sodium Citrate | 1.5 |
| Total amount of antimcrobials | 3.0 |
| Monoglycerides with Sodium Stearoyl Lactate | 1 |
| Citric Acid | .5 |
| Lactic Acid | .5 |
| Herbalox ® | .04 |
| BHA and BHT | .0015 |
| Sodium Nitrite | .0067 |

Example 4 Preparation

In Example 4, the primary source of protein (a combination of beans and rice) is added to the single feed hopper/blender with a leveling ribbon for mixing. Textured soy protein isolate is added to the beans and rice blend.

An additional amount of 90% lean ground beef is then blended with the primary source of protein and soy isolate mixture. Tomato paste, oat bran, commercial Mexican spice blend, salt, beef extract, sodium lactate and sodium citrate, monoglycerides with sodium stearoyl lactate, Herbalox®, BHA, BHT, and sodium nitrite are then added to the beans, rice, meat, fat and soy isolate combination and mixed for 10 minutes. The product is then blended for an additional 5 minutes. Corn syrup solids, glycerine, vinegar, maltodextrin, modified corn starch, sorbitol, citric and lactic acids are then added and blended for an additional 10 minutes. The viscous raw product mixture is then pumped to the auger feeder unit, where it is moved on to the primary SSHE, which provides constant agitation of the product mixture as it cooks. An internal product temperature of 215° F. must be reached to insure proper pasteurization of the meat. The cooked product is then pumped through a a second in-line SSHE to initiate cooling action. After cooling the cooked product to an internal temperature of 125° F., or less, it is pumped from a discharge pipe and allowed to flash cool to ambient temperature. The product is then packaged in a suitable vacuum packaging material immediately upon release from the system to prevent unwanted contamination of the cooked/pasteurized product. The resulting product looks and smells like freshly cooked beans and rice, mixed with beef chile.

An example of a specific implementation of the method for preparing a fully-cooked, semi-moist, shelf stable meat product comprises the steps of: mixing ground meat as a first source of water with a source of vegetable protein to produce a first mixture; mixing the first mixture with one or more humectants, such as protein meals, flours, protein concentrates, protein isolates, protein derivatives, sugars, flavorings, seasonings, acids, starches, cures, and preservatives to produce a second mixture; cooking the second mixture at a temperature of greater than about 215° F. in a first SSHE to produce a cooked mixture; cooling the cooked mixture using a second SSHE to ambient temperature to produce an end product; and packaging the end product under anaerobic vacuum using a moisture and oxygen impermeable container.

Another example of a specific implementation of the method for preparing a fully-cooked, semi-moist, shelf stable meat product comprises the steps of: admixing a first source of protein comprising animal specie meat having about 50% to 70% water by weight with a second source of protein consisting of an isolated source of vegetable protein to obtain a first mixture; admixing the first mixture with one or more humectants to obtain a second mixture; cooking the second mixture at a temperature of from about 215° F. to about 350° F. to produce a cooked mixture; cooling the cooked mixture to produce an end product; and packaging the end product under anaerobic vacuum.

Although the invention has been described with reference to specific embodiments, this description is not meant to be construed in a limited sense. Various modifications of the disclosed embodiments, as well as alternative embodiments of the invention will become apparent to persons skilled in the art upon reference to the disclosure herein. It is, therefore, contemplated that the appended claims will cover such modifications that fall within the scope of the invention.

I claim:

1. A method of preparing a fully-cooked, semi-moist, shelf stable meat product comprising the steps of;
    first admixing a fist source of protein and water consisting of animal specie meat with a second source of protein consisting of an isolated source of vegetable protein to obtain a first mixture;
    subsequently admixing said first mixture with one or more humectants to obtain a second mixture;
    cooking said second mixture at a temperature of from about 215° F. to about 350° F. to produce a cooked mixture;
    flash cooling said cooked mixture to produce an end product; and
    packaging said end product under anaerobic vacuum.

2. The method of claim 1 wherein said first source of protein and water is a primary source of available water in said first mixture and said second source of protein is a primary agent for reducing the amount of available water in said first mixture.

3. The method of claim 1 wherein said subsequently admixing step further comprises the addition of food grade, edible acids to said second mixture so as to produce said end product having a pH of less than about 6.0.

4. The method of claim 1 wherein said cooking step further comprises the use of a first scraped-surface heat exchanger.

5. The method of claim 4 wherein said flash cooling step further comprises the use of a second scraped-surface heat exchanger.

6. The method of claim 5 wherein said flash cooling step further comprises the use of a cooling tower adaptor for said first scraped-surface heat exchanger.

7. The method of claim 1 wherein said subsequently admixing step further comprises the addition of one or more ingredients selected from the group consisting of salts, cures, flavorings, concentrated proteins, fillers, bulking agents, antioxidants, preservatives and antimicrobials so as to further S reduce the amount of available water in said first mixture.

8. The method of claim 1 wherein said subsequently admixing step further comprises the addition of food grade, edible acids to said second mixture so as to reduce the pH of said end product.

9. The method of claim 1 wherein said cooking step is conducted at a pressure of less than 30 psi.

10. The method of claim 1 wherein said cooking step further comprises the constant movement of said second mixture so as to avoid a browning reaction from said first or said second source of protein.

11. The method of claim 1 wherein said packaging step further comprises the use of an oxygen and moisture impermeable barrier to isolate said end product from the ambient atmosphere.

12. The method of claim 1 wherein said packaging step further comprises surrounding said end product with a microbe inhibiting atmosphere having an oxygen-scavenging agent placed therein or packaged with said agent.

13. The method of claim 2 wherein said humectants are a secondary source of reducing the amount of said available water in said first mixture to a water activity of less than about 0.86.

14. A method of preparing a fully-cooked, semi-moist, shelf stable meat product comprising the steps of:
    first admixing a first source of protein comprising animal specie meat having about 50% to 70% water by weight with a second source of protein consisting of a non-meat protein to obtain a first mixture;
    subsequently admixing said first mixture with one or more humectants to obtain a second mixture;
    cooking said second mixture at a temperature of about 215° F. to 350° F. to produce a cooked mixture;
    flash cooling said cooked mixture to produce an end product; and
    packaging said end product under anaerobic vacuum.

15. The method of claim 14 wherein said first source of protein is selected from a group consisting of beef, pork, lamb, fish, fowl, and krill.

16. The method of claim 15 wherein said first source of protein is a primary source of available water in said first mixture and said second source of protein is a primary source of reducing the amount of available water in said first mixture.

17. A method of preparing a fully cooked, semi-moist, shelf stable meat product comprising the steps of:
    first mixing ground meat as a first source of water with a source of non-meat proteins to produce a first uncooked mixture;
    subsequently mixing said first mixture with one or more ingredients selected from the group consisting of protein meals, flours, protein concentrates, protein isolates, protein derivatives, sugars, humectants, flavorings, seasonings, acids, starches, cures, and preservatives to produce a second mixture;
    cooking said second mixture at a temperature of greater than about 215° F. in a first scraped-surface heat exchanger to produce a cooked mixture; and
    flash cooling said cooked mixture using a second scraped surface heat exchanger to ambient temperature to produce an end product.

18. A method of preparing a fully-cooked, semi-moist, shelf stable meat product comprising the steps of:
    providing an uncooked mixture comprising a first source of protein and water consisting of animal specie meat, a second source of protein consisting of an isolated source of vegetable protein, and one or more humectants;
    then cooking the uncooked mixture at a temperature of from about 215° F. to about 350° F. to produce a cooked mixture; and
    flash cooling the cooked mixture to produce an end product.

19. The method of claim 20 wherein said cooking step comprises the use of a scraped-surface heat exchanger.

20. The method of claim 20 wherein said flash cooling step comprises the use of a scraped-surface heat exchanger.

* * * * *